July 7, 1970  R. M. CARSON ETAL  3,518,791
ADJUSTABLE PLANT STRING CLIP
Filed May 28, 1968
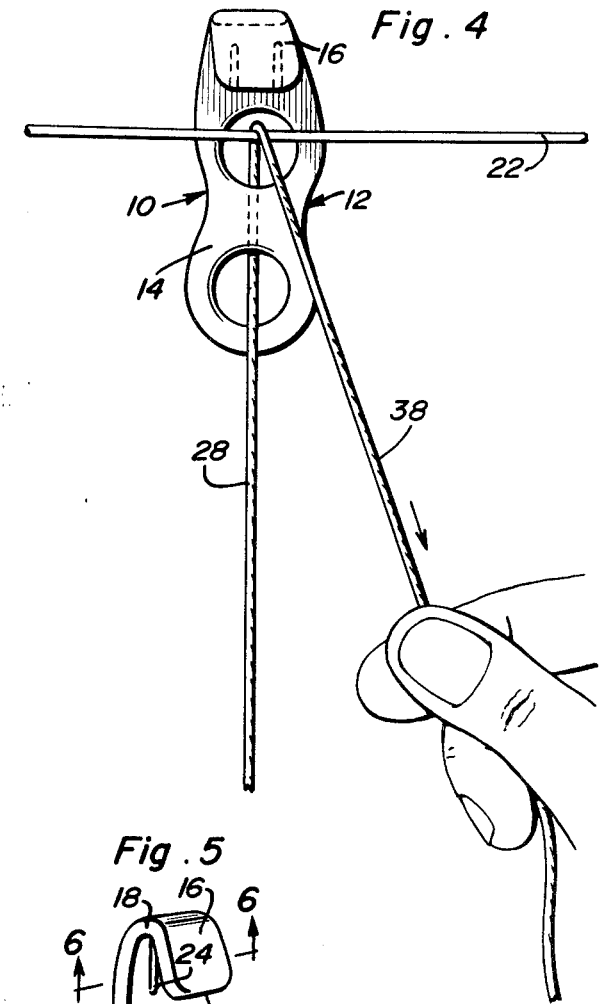
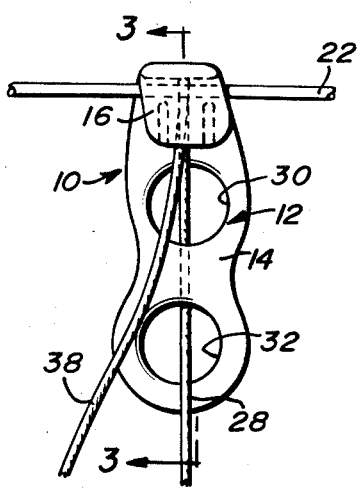
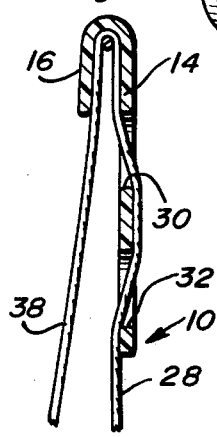
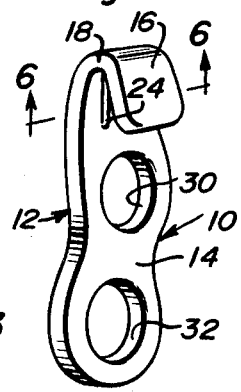
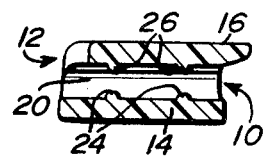
Raymond M. Carson
Wesley R. Carson
INVENTORS

# United States Patent Office 3,518,791
Patented July 7, 1970

3,518,791
ADJUSTABLE PLANT STRING CLIP
Raymond M. Carson, Box 101, and Wesley R. Carson, Rte. 1, both of Faxon, Okla. 73540
Filed May 28, 1968, Ser. No. 732,718
Int. Cl. A01g 17/04
U.S. Cl. 47—47                                       11 Claims

ABSTRACT OF THE DISCLOSURE

An inverted generally J-shaped clip constructed of panel-like material and including short and long leg portions thereof interconnected by means of generally U-shaped bight portion, the long leg portion of the clip including a plurality of openings formed therethrough through which a tension member may be threaded and frictionally retained against longitudinal shifting relative to the clip.

---

When plants are grown in greenhouses the portions of the plants above the ground are supported by strings whose lower end portions are secured to the base of the stalk portions of the plants and whose upper ends are supported from suspension wires provided for that purpose in greenhouses. Once a string suspended from a suspension wire has its lower end secured to the base end portion of the stalk of a plant, it is thereafter necessary for the string to be elevated periodically as the portion of the stalk of the plant to which the string is secured grows upward from the ground. Of course, when but a few plants are involved the process of untying and retying each support string to its suspension wire in a manner to elevate the string is not too time-consuming. However, when the greenhouse plants are being grown in large numbers even one second of extra time involved in adjusting each plant support string can add up to a considerable loss in man hours. It would therefore also follow that if a means could be provided whereby five to ten seconds or more could be saved in each support string adjusting operation performed, many many man hours of labor could be saved.

It is accordingly the main object of this invention to provide a support clip for plant support strings including improved structural features enabling each associated support string to be adjusted within a manner of but a few seconds.

Still another object is to provide an adjustable clamp string clip in accordance with the preceding object which may be readily constructed of various sizes so as to be adaptable for use with various types of plant support strings.

A further object of this invention is to provide a clip for supporting plant support strings and enabling rapid adjustment of the strings, rapid attachment of the clips to the associated suspension wire and rapid attachment of the associated plant support string thereto.

A final object of this invention to be specifically enumerated herein is to provide an adjustable plant string clip in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of a tomato plant having the base portion of its stalk supported from the lower end of a support string whose upper end is supported by a suspension wire with a support string adjusting clip constructed in accordance with the present invention;

FIG. 2 is an enlarged side elevational view of the central uppermost portion of FIG. 1 more clearly illustrating the structure of the clip and the manner in which it is supported from the suspension wire;

FIG. 3 is a fragmentary vertical sectional view taken substantially upon the plane indicated by the section line 3—3 of FIG. 2;

FIG. 4 is a view similar to FIG. 2 but illustrating the manner in which the associated support string may be adjusted merely by pulling on the free end of the support string in order to upwardly displace the clip relative to the suspension wire and slide the support string over the suspension wire prior to releasing the free end of the string and allowing the clip to drop to its support string supporting position illustrated in FIGS. 1–3;

FIG. 5 is a perspective view of the clip; and

FIG. 6 is a sectional view taken upon the plane indicated by the section line 6—6 of FIG. 5.

Referring now more specifically to the drawings the numeral 10 generally designates the string support clip of the instant invention. The clip 10 defines a generally J-shaped body referred to in general by the reference numeral 12 and which is used in inverted position. The body 12 includes a long leg 14 and a short leg 16 which generally parallels the long leg 14. Corresponding ends of the long and short legs 14 and 16 are interconnected by means of a generally U-shaped bight portion 18 and it may be seen from FIGS. 3 and 5 of the drawings that the entire clip may be constructed of suitable stiff but slightly flexible strap material.

The U-shaped bight portion 18 defines a channel 20 which is adapted to snugly and slidingly receive a suspension wire 22 therethrough and the opposing surface portions of the long and short legs 14 and 16 include pairs of laterally spaced apart inwardly projecting ribs 24 and 26 adapted to receive the adjacent portions of a plant support string 28 trained over the support wire 22 therebetween. Further, the short leg 16 is slightly inclined relative to the long leg 14 in order that one end of the channel 20 is of a transverse dimension slightly less than the transverse dimension of the other end of the channel 20. Also, the long leg 14 includes a pair of longitudinally spaced openings 30 and 32 through which the free end of the plant support string 28 is threaded. The center of the opening 32 is slightly offset from a plane disposed normal to the bottom of the channel 20 and passing through the center of the opening 32 toward the narrow end of the channel 20. However, if it is desired, the opening 32 need not be offset relative to the opening 30 as will be hereinafter more fully set forth.

In operation, the suspension wire 22 is disposed over and extends along a row of plants such as the tomato plant 34 and when the plants 34 become sufficiently large to require their being supported from the suspension wire 22, a suitable number of clips 10 may be engaged with the support wire 22 over the corresponding plants 34. Then, a plurality of plant support strings 28 may have the lower ends thereof tied or otherwise secured about the base of the corresponding plant stalk as at 36 with the upper ends of the plant support strings 28 passing upwardly and over the support wire 22 between the long and short legs 14 and 16 of the clips 10. Thereafter, the free end 38 of each plant support string 28 is threaded outwardly through the upper opening 30 and inwardly and downwardly through the lower opening 32.

After the plant support string 28 has been threaded through the openings 30 and 32 and the upper portion of the stalk of the plant 34 has been positioned about the reach of the string 28 extending from the clip to the bottom of the stalk, the plant may be engaged by one hand and lifted as desired while the other hand grips and pulls downwardly on the free end 38 of the string 28. As the free end 38 is pulled downwardly to depress the suspension wire 22, the frictional contact of the reach of the string 28 extending through the openings 30 and 32 with that portion of the body disposed between the openings and defining the edges of the openings will cause the clip 10 to be held stationary relative to the string until the suspension wire 22 has been lowered to the position thereof illustrated in FIG. 4 of the drawings. Continued downward pulling on the free end 38 of the string 28 will then slide the string over the suspension wire 22 in order to properly tension the reach of the string 28 extending from the wire 22 to the lower portion of the stalk of the plant 34. After the desired tension of the string 28 has been achieved, the free end 38 of the string 28 may be released whereby the string 28 will slip backward over the suspension wire 22 so as to lower the clip 10 relative to the wire 22 and clampingly engage the two reaches of the string 28 between the wire 22 and the opposing surfaces of the legs 14 and 16 with the reaches of the string 28 disposed between the ribs 24 and 26. Thus, the plant 34 will be properly supported from the suspension wire 22. Thereafter, should it become necessary to adjust the tension of the reach of the string 28 extending between the wire 22 and the base of the stalk of the plant 34, it is merely necessary to grasp the free end 38 of the string 28 and pull downwardly upon the free end 38 until the desired tension of the plant supporting reach of the string 28 is achieved prior to release of the free end 38 of the string 28.

If the openings 30 and 32 are in vertical alignment the clip 10 will have a greater clamping action upon the string 28 and thus if heavy plants are to be supported the openings 30 and 32 should be in vertical alignment. In addition, if the openings 30 and 32 are not vertically aligned, as the free end 38 of the string 28 is pulled downwardly in order to tighten the string 28, the clip 10 will move upwardly relative to the suspension wire 22 and lean slightly relative to the wire 22. Further, as hereinbefore set forth, the channel 20 tapers toward one end and when it becomes necessary to lean the plants 34 as they grow to a height approaching the support wire 22, the free end of the string 28 may be pulled downwardly when tensioning the string 28 and also along the support wire 22 in a direction in which the narrow end of the channel 22 opens so as to incline the plant 34. When the free end 38 of the plant support string 28 is released after inclining the plant 34, the clip will again tightly clamp the string 28 about the support wire 22. This ability of the clip 10 to be slid along the support wire 22 in order to incline the plants 34 is important inasmuch as it could be necessary to shift the clip 10 as much as 30 or 40 feet along the support wire 22 near the end of the growing season in order that the plant 34 may be supported in a substantially straight condition when its total length exceeds 30 or 40 feet.

In actual practice, it has been found that when the associated plant is first tied, the free end 38 of the string 28 should be approximately 24 inches in length. As the plant grows upward toward the suspension wire 22 and the clip 10 is shifted along the wire 22, the free end 38 of the string 28 becomes shorter. When the free end of the string is only about 6 inches long, the string is untied at the bottom of the plant and is retied at a point further upward along the plant perhaps 2 or 3 feet from the base of the main stem of the plant. This of course increases the length of the free end 38 of the string 28 for further adjusting of the clip 10 along the wire 22 when it becomes necessary to again further incline the plant.

In order to release the clip 10 so that it may be slid along the wire 22, the free end 38 of the string 28 is first pulled downwardly in order to cause the clip 10 to be raised relative to the suspension wire 22. Then, the free end 38 of the string 28 is moved along the suspension wire out from under the bight portion of the clip 10 toward the right as viewed in FIG. 4 of the drawings. Then, while the free end 38 of the string 28 is out from under the bight portion of the clip 10, downward pull on the free end 38 is partially relaxed in order to allow the string to slide downwardly through the openings 30 and 32 before swinging the free end 38 of the string 28 back underneath the bight portion of the clip 10 in order to allow the latter to clampingly engage the string 28. As the plant grows this adjustment process is repeated and in some instances numerous times until the plant grows to some 40 feet in length with the longer main stem of the plant lying on the ground parallel to the suspension wire 22, but the growing end still elevated by the string 28 fastened to the suspension wire. Accordingly, it can be seen that the tapering of the channel 20 is important in that it must be capable of tightly gripping the suspension wire 22 in order to prevent the clip 10 from sliding horizontally along the suspenssion wire 22.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a thin horizontally disposed elongated suspension member and an upstanding elongated flexible plant supporting tension member having its upper end portion draped over said suspension member, an adjustable plant support clip, said clip comprising a body including first and second generally parallel legs interconnected at one pair of corresponding end portions by means of a curve bight portion whose inner surface portions define the bottom of a channel defined between said legs, said clip being inverted and placed over said suspension member and the adjacent portions of said tension member with said suspension member received in said channel, one of said legs overlying the reach of said tension member extending from said suspension member to the other end of said tension member and including friction surface means spaced longitudinally therealong from said channel bottom frictionally engaged with said reach of said elongated flexible tension member extending from said suspension member to the other end of said tension member to cause upward displacement of said clip relative to said suspension member with said adjacent reach in response to a downward pull on the other reach of said tension member extending along and inwardly of the other leg of said clip to slide said tension member lengthwise over said suspension member so as to elevate said adjacent reach of said tension member relative to said suspension member, said friction surface means and the channel defined by said clip being adapted to frictionally and clampingly engage the first mentioned reach of said tension member against longitudinal shifting relative to said suspension member when said clip is seated over said tension and suspension members.

2. The combination of claim 1 wherein said clip is constructed of strap-like material formed into a generally U-shaped configuration.

3. The combination of claim 1 wherein said other leg is shorter than said one leg.

4. The combination of claim 1 wherein said channel tapers in width from one end to the other.

5. The combination of claim 4 wherein said clip is constructed of strap-like material formed into a generally J-shaped configuration.

6. The combination of claim 1 wherein said clip is constructed of strap-like material formed into a generally U-shaped configuration, said means including a pair of openings formed in said one leg at points spaced longitudinally therealong and from said bottom adapted to have the corresponding reach of said tension member threaded therethrough in opposite directions with the portion of said one reach extending between said openings disposed on the outside of said one leg.

7. The combination of claim 1 wherein said openings are spaced intermediate the opposite marginal edge portions of said one leg and are out of communication with said marginal edge portions.

8. In combination with a thin horizontally disposed elongated suspension member and an upstanding elongated flexible plant supporting tension member having its upper end portion draped over said suspension member, a clip including a pair of generally parallel legs interconnected at one pair of corresponding ends by means of a curved bight portion forming the bottom of a channel defined between said legs, said clip being inverted and placed over the portion of said suspension member over which said tension member is draped, one of said legs having a pair of openings formed therethrough spaced longitudinally therealong and from said bottom and having the end of one reach of said elongated flexible tension member threaded therethrough in opposite directions with the portion of said one reach of said tension member extending between said openings disposed on the outside of said one leg.

9. The combination of claim 8 wherein said clip is constructed of strap-like material formed into a generally U-shaped configuration.

10. The combination of claim 9 wherein said other leg is shorter than said one leg.

11. The combination of claim 10 wherein said channel tapers in width from one end to the other.

References Cited

UNITED STATES PATENTS

| 722,949 | 3/1903 | Crowe. | |
|---|---|---|---|
| 2,579,240 | 12/1951 | Masoner | 248—317 |
| 2,862,334 | 12/1958 | Sandvig | 47—47 |

FOREIGN PATENTS

| 5,844 | 3/1902 | Great Britain. |
|---|---|---|
| 125,039 | 4/1919 | Great Britain. |

ROBERT E. BAGWILL, Primary Examiner

U.S. Cl. X.R.

24—115; 248—328, 339